(12) United States Patent
Gilbert

(10) Patent No.: US 12,454,797 B1
(45) Date of Patent: Oct. 28, 2025

(54) SYSTEM AND METHOD FOR PAVER WITH RECYCLED MATERIALS

(71) Applicant: Vincent Paul Gilbert, Vancouver, WA (US)

(72) Inventor: Vincent Paul Gilbert, Vancouver, WA (US)

( * ) Notice: Subject to any disclaimer, the term of this patent is extended or adjusted under 35 U.S.C. 154(b) by 0 days.

(21) Appl. No.: 19/273,770

(22) Filed: Jul. 18, 2025

Related U.S. Application Data

(60) Provisional application No. 63/688,481, filed on Aug. 29, 2024.

(51) Int. Cl.
*E01C 5/20* (2006.01)
*E01C 5/22* (2006.01)

(52) U.S. Cl.
CPC ...................... *E01C 5/22* (2013.01)

(58) Field of Classification Search
CPC .......................................... E01C 5/22
USPC ...................................... 404/34–46
See application file for complete search history.

(56) References Cited

U.S. PATENT DOCUMENTS

| | | | | |
|---|---|---|---|---|
| 1,729,256 | A * | 9/1929 | Honberger | E01C 5/22 404/44 |
| 1,925,460 | A * | 9/1933 | Pegram | B28B 19/0053 264/261 |
| 2,126,965 | A * | 8/1938 | Leguillon | E01C 5/226 404/32 |
| 5,746,545 | A * | 5/1998 | Parker, Jr. | E02B 3/122 404/35 |
| 7,849,646 | B2 * | 12/2010 | Harinishi | E04F 15/22 52/480 |
| 8,286,337 | B2 | 10/2012 | Mills | |
| 8,910,362 | B2 | 12/2014 | Zyman | |
| 9,321,138 | B2 * | 4/2016 | Gilbert | B23P 19/048 |
| 9,556,567 | B2 | 1/2017 | Kaylor et al. | |
| 2014/0137492 | A1 * | 5/2014 | French | E04C 2/06 52/223.6 |
| 2015/0233066 | A1 | 8/2015 | Ouellet | |

FOREIGN PATENT DOCUMENTS

| | | |
|---|---|---|
| GB | 2585218 A | 1/2021 |
| KR | 101089505 B1 | 12/2011 |
| KR | 101526519 B1 | 6/2015 |
| KR | 102173290 B1 | 11/2020 |
| KR | 20200141238 A | 12/2020 |

(Continued)

OTHER PUBLICATIONS

"Mattress wiring for slab.would that work?," reddit.com. https://www.reddit.com/r/Concrete/comments/ygw432/mattress_wiring_for_slabwould_that_work/?rdt=39022 [Date accessed: Jul. 30, 2024].

(Continued)

*Primary Examiner* — Raymond W Addie
(74) *Attorney, Agent, or Firm* — Bold IP, PLLC; Christopher Mayle

(57) ABSTRACT

A system and method for a paver that may include recycled materials crushed, cement, water, and mattress spring assembly embedded within the concrete mixture, wherein the mattress spring assembly comprises a plurality of interconnected coil springs, wherein the recycled materials comprise at least one of concrete, bricks, and porcelain that is crushed to 1 inch or smaller in diameter.

15 Claims, 6 Drawing Sheets

(56) References Cited

FOREIGN PATENT DOCUMENTS

KR 102352183 B1 1/2022

OTHER PUBLICATIONS

"What are the waste material that can be use as cement additives?," quora.com. https://www.quora.com/What-are-the-waste-material-that-can-be-use-as-cement-additives [Date accessed: Jul. 30, 2024].
"Concrete Bed," Pinterest. https://www.pinterest.com/pin/97953360619133192/ [Date accessed: Jul. 26, 2024].
"Council to produce tiles from dumped mattresses," governmentnews.com.au. https://www.governmentnews.com.au/council-to-produce-tiles-from-dumped-mattresses/ [Date accessed: Jul. 26, 2024].

\* cited by examiner

SYSTEM AND METHOD FOR PAVER WITH RECYCLED MATERIALS

This application claims priority to U.S. Provisional Patent Application No. 63/688,481 filed Aug. 29, 2024.

FIELD OF THE DISCLOSURE

Field of the Disclosure

The overall field of this invention relates to pavers and more particularly, pavers made from rock and mattress springs which give strength to the panel, while creating an enhanced sustainability environment.

Background

Waste management has become an increasingly common problem in today's world. The sheer volume of waste generated globally continues to increase, straining existing disposal systems and infrastructure. Landfills are reaching capacity in many areas, leading to environmental concerns such as groundwater contamination and greenhouse gas emissions. In many developing countries, inadequate waste collection systems result in open dumping and burning, causing air pollution and public health issues. The complexity of modern waste streams, including materials like composites and multi-layer packaging, makes recycling more challenging and less economically viable. Additionally, the lack of public awareness and inconsistent recycling practices across different regions hinder effective waste reduction and recycling efforts. These issues collectively underscore the urgent need for improved waste management strategies, technologies, and policies worldwide. Thus exists the need for a new system and method that utilizes waste such as bed springs into a new material for a paver.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

SUMMARY

Figure 1:
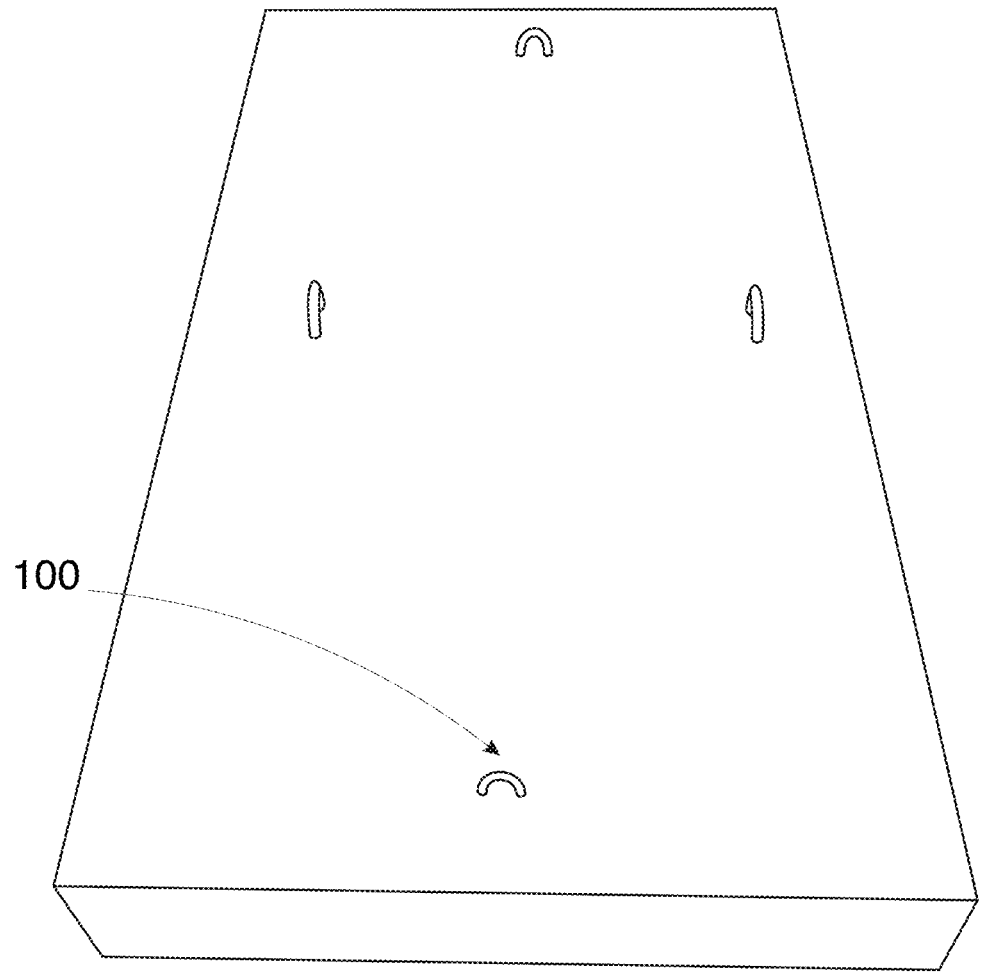
FIG. 1 is a first embodiment size of the paver.
Figure 2:
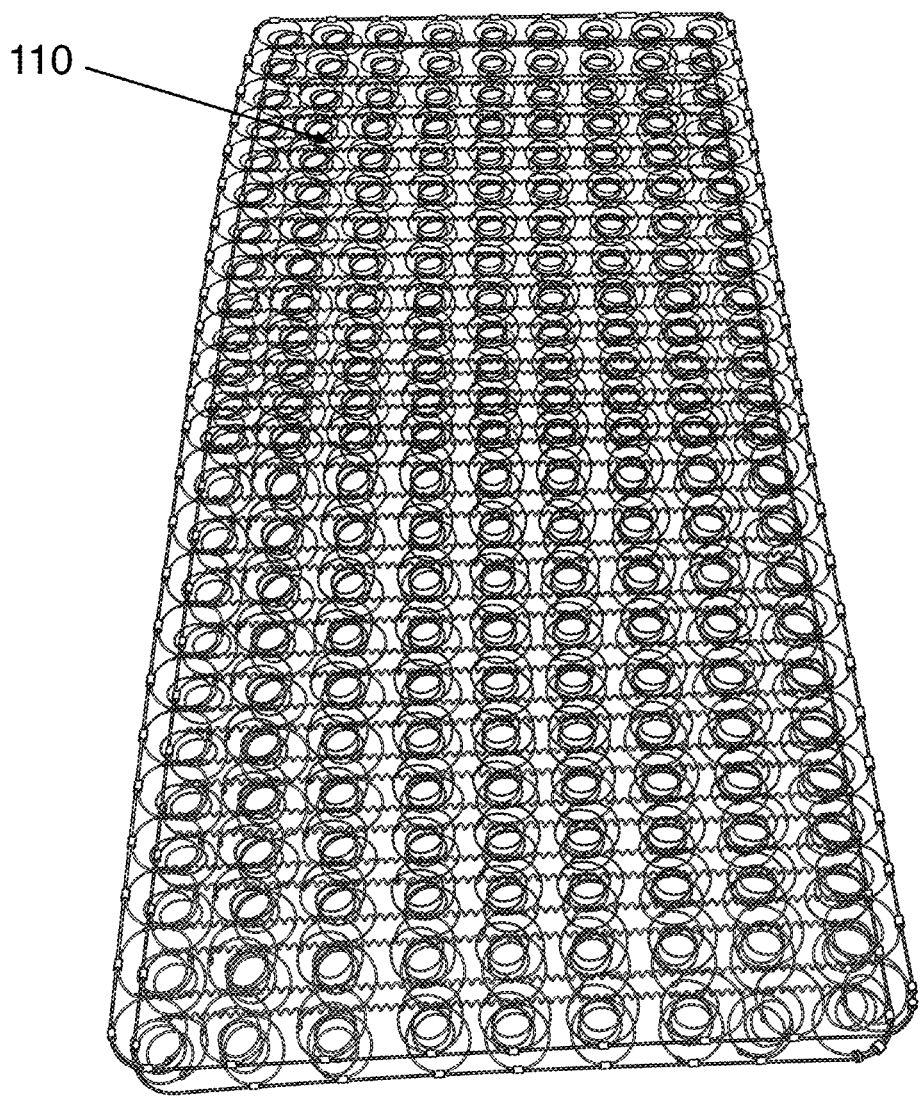
FIG. 2 is a first embodiment size of the mattress springs.
Figure 3:
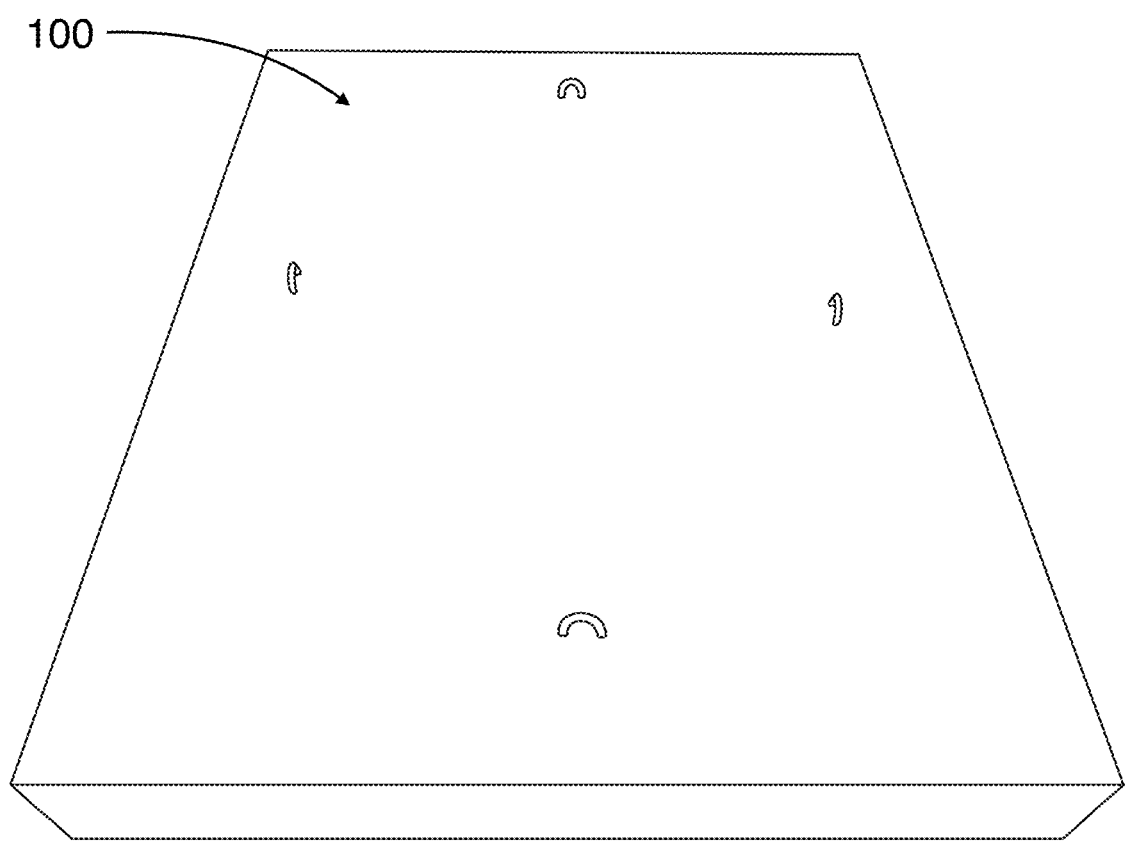
FIG. 3 is a second embodiment size of the paver.
Figure 4:
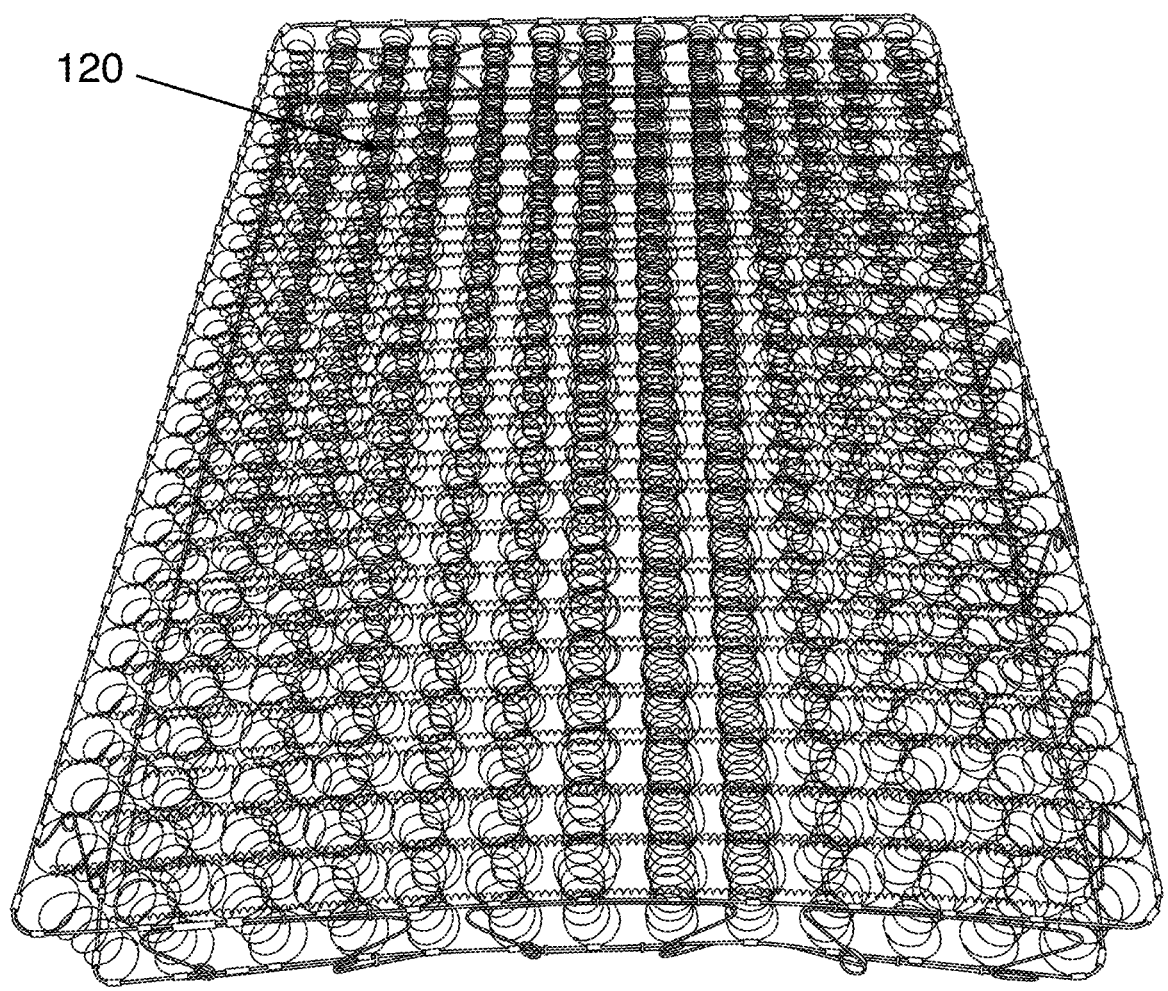
FIG. 4 is a second embodiment size of the mattress springs.
Figure 5:
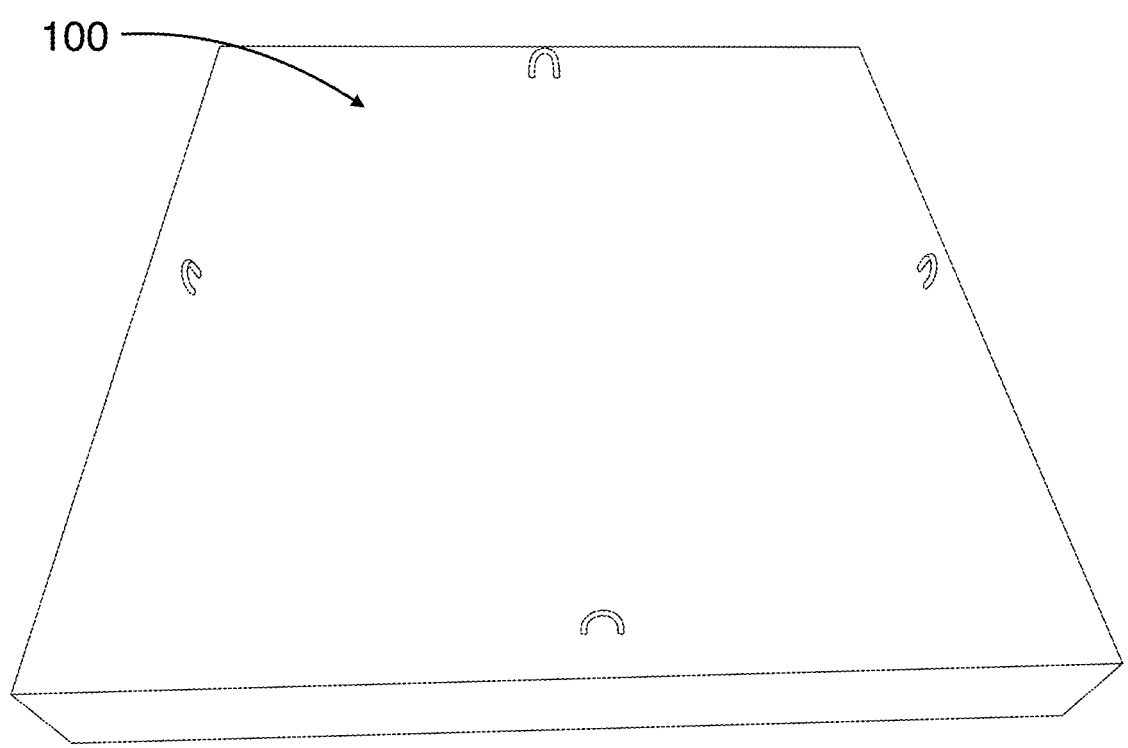
FIG. 5 is a third embodiment size of the paver.
Figure 6:
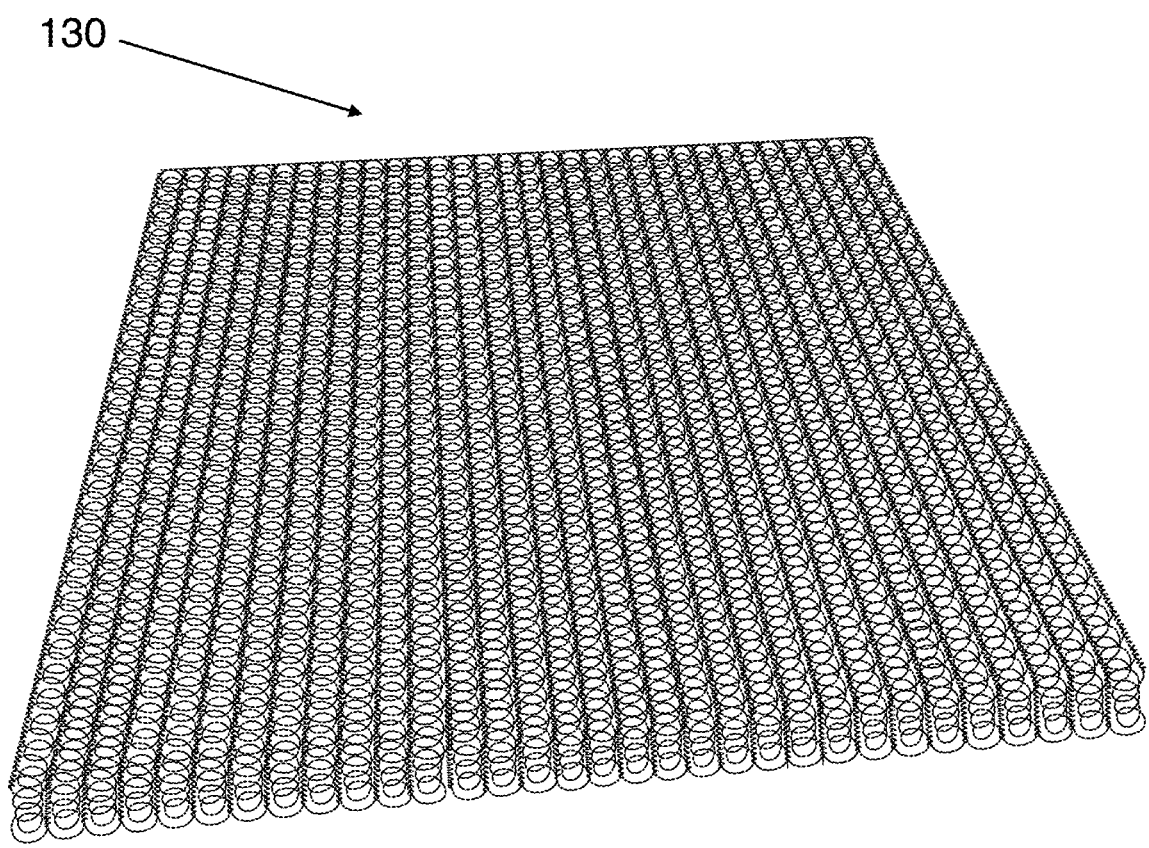
FIG. 6 is a third embodiment size of the mattress springs.

The present invention solves the deposition of mattress springs to create an instant paver of concrete with no waiting times for curing that may be used in driveways or roads. The present invention provides a system and method for a more sustainable paver whereby recycled concrete, bricks, porcelain, and other materials are positioned through a rock crusher, making an inch minus base rock, whereby recycled mattress springs are placed in a concrete mold. The rocks are then mixed with cement and water and is then poured in the mold to provide a new material.

Using recycled materials to make concrete offers numerous benefits, both environmental and economic. This practice significantly reduces landfill waste and lowers the demand for raw material extraction, thereby decreasing the overall carbon footprint of concrete production. Cost savings are another advantage, as recycled materials are often less expensive than virgin resources and may reduce transportation costs if sourced locally. This approach also aids in conserving natural resources by preserving raw materials like natural aggregates and reducing energy consumption in material processing. Interestingly, some recycled materials can actually enhance concrete properties, improving durability, strength, or workability in certain applications. Utilizing recycled materials in concrete production helps meet green building standards and aligns with circular economy principles, fostering regulatory compliance. Lastly, this practice drives innovation, encouraging research into new concrete formulations and the development of more efficient recycling technologies.

In some aspects, the techniques described herein relate to a paver including: a concrete mixture including: crushed recycled materials; cement; water; and a mattress spring assembly embedded within the concrete mixture, wherein the mattress spring assembly includes a plurality of interconnected coil springs.

In some aspects, the techniques described herein relate to a paver, wherein the recycled materials include at least one of concrete, bricks, and porcelain.

In some aspects, the techniques described herein relate to a paver, wherein the mattress spring assembly includes at least one of pocket springs, Bonnell springs, Offset springs, and Continuous Wire springs.

In some aspects, the techniques described herein relate to a paver, wherein the paver has dimensions corresponding to standard mattress sizes.

In some aspects, the techniques described herein relate to a paver, wherein the paver has dimensions of approximately 77 inches by 42 inches corresponding to a twin-size mattress spring assembly.

In some aspects, the techniques described herein relate to a paver, wherein the paver has dimensions of approximately 85 inches by 64.5 inches corresponding to a queen size mattress spring assembly.

In some aspects, the techniques described herein relate to a paver, wherein the paver has dimensions of approximately 77 inches by 83 inches corresponding to a king size mattress spring assembly.

In some aspects, the techniques described herein relate to a paver, wherein the recycled materials are crushed to a size of one inch or smaller in diameter.

In some aspects, the techniques described herein relate to a method of manufacturing a paver, the method including: crushing recycled materials to a size of one inch or smaller in diameter; placing a mattress spring assembly into a concrete mold; mixing cement with the crushed recycled materials and water to form a concrete mixture; pouring the concrete mixture into the concrete mold containing the mattress spring assembly; and allowing the concrete mixture to cure; and removing the cured paver from the concrete mold.

In some aspects, the techniques described herein relate to a method, wherein crushing the recycled materials includes using at least one of a jaw crusher, cone crusher, impact crusher, ball mill, hammer mill, and roll crusher.

In some aspects, the techniques described herein relate to a method, wherein mixing the cement includes mixing at between 14 and 18 revolutions per minute.

In some aspects, the techniques described herein relate to a method, wherein the water has a temperature above 50 degrees Fahrenheit.

In some aspects, the techniques described herein relate to a method, further including: applying a release agent to the concrete mold prior to placing the mattress spring assembly.

In some aspects, the techniques described herein relate to a method, further including: spreading the concrete mixture evenly within the mold using at least one of a trowel and vibration to remove air bubbles.

In some aspects, the techniques described herein relate to a method, wherein allowing the concrete mixture to cure includes curing for three hours.

In some aspects, the techniques described herein relate to a system for manufacturing pavers including: a rock crusher configured to crush recycled materials to a size of one inch or smaller in diameter; a concrete mold sized to receive a mattress spring assembly; a mixer configured to mix cement, the crushed recycled materials, and water at a specified revolution rate.

In some aspects, the techniques described herein relate to a system, wherein the mixer is configured to operate at between 14 and 18 revolutions per minute.

In some aspects, the techniques described herein relate to a system, wherein the concrete mold includes at least one of wood, steel, plastic, and rubber.

In some aspects, the techniques described herein relate to a system, wherein the system is configured to cure the paver for approximately three hours.

In some aspects, the techniques described herein relate to a system, wherein the recycled materials include at least one of concrete, bricks, and porcelain.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skills in the art to which this disclosure pertains.

With reference to FIG. 1, one embodiment of the present invention is illustrated including a composite paver material for a paver 100. Paver 100 may be a flat piece of material used in outdoor landscaping and construction to create hard surfaces for walkways, driveways, patios, and other outdoor areas. Paver 100 may come in different sizes and shapes such as but not limited to rectangular, square, hexagonal, or irregularly shaped.

To begin operation to create paver 100, a series of recyclable materials such as concrete, bricks, porcelain, and other materials may be collected and then reduced to one inch in diameter or smaller. The recyclable materials may be diminished in size by a rock crusher. The rock crusher may come in many forms such as a jaw crusher which uses compression to break down large materials between a fixed and a moving plate. The rock crusher may be a cone crusher whereby materials are crushed between a gyrating spindle and a bowl-shaped outer shell.

The rock crusher may be an impact crusher which utilizes high-speed impacts to shatter materials against a hard surface. The rock crusher may be a ball mill which has large rotating drums filled with steel balls that pulverize materials through collision and friction. The rock crusher may be a hammer mill which uses swinging hammers to repeatedly strike materials until they're crushed to the desired size. The rock crusher may be a roll crusher whereby materials are compressed between two rotating cylinders. In other non-limiting embodiments, hammers, sledgehammers, excavators, blasting, and thermal shock may also be used.

The next step may include gathering mattress springs and positioning them into a concrete mold or other vessel. Mattress springs may be in the form of a collective body of connected springs for a bed such as a queen-, king-, full-, or twin-size bed. The mattress springs may include a base layer of coil springs that provide support and cushioning. As illustrated in FIGS. 1-6, for example, a 77"×42" (length× width) twin size paver 100 may be created from a 72.5"× 36.75" (length×width) twin size mattress spring 110, an 85"×64.5" queen size paver 100 may be created from a 72.5"×52" queen size mattress spring 120, a 77"×83" king size paver 100 may be crated from a 69.5"×70.5 king size mattress spring 130. In some embodiments smaller sized molds for mattress springs may be cut in a smaller size to be more applicable to residential settings.

Various coils may be used such as pocket springs, Bonnell, Offset, and Continuous Wire. The concrete mold may be in the form of any shaped container that may be used to shape liquid concrete into a desired shape or structure as it hardens. The concrete mold may be made from wood, steel, plastic, rubber, or other suitable materials. The concrete mold may be coated with a release agent to prevent sticking.

Cement may then be mixed with recyclable materials and mixed at high speed with warm water. The mixing may be at a rate of 14 to 18 revolutions per minute. However, this is non limiting and may be any number of revolutions. The strength may be raised or lowered by addition or subtraction of the amount of cement.

Water in one or more preferred embodiments is at a temperature over 50 degrees Fahrenheit. However, this is non-limiting and the temperature of the water may be any suitable temperature that does not stray away from the purpose of the present invention. Water may be heated to this designated temperature or collected and mixed in at this temperature. Components of paver material 100 may be mixed by an automatic mixing machine or manually into a mixture.

Once mixed, the mixture may be poured into the concrete mold to create paver material 100. A trowel or vibration may be used to spread evenly and remove air bubbles. Paver material 100 may then be cured for a recommended amount of time such as three hours. The paver may then be demolded once fully cured and then utilized for the current project or task. The process may then be repeated for as many pavers as needed for the current project or task The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A paver comprising: a concrete mixture comprising:
recycled aggregates;
cement;
water; and
a mattress spring assembly embedded within the concrete mixture, wherein the mattress spring assembly comprises a plurality of interconnected coil springs.

2. The paver of claim 1, wherein the recycled materials comprise at least one of concrete, bricks, and porcelain.

3. The paver of claim 1, wherein the mattress spring assembly comprises at least one of pocket springs, Bonnell springs, Offset springs, and Continuous Wire springs.

4. The paver of claim 1, wherein the paver has dimensions corresponding to standard mattress sizes.

5. The paver of claim 4, wherein the paver has dimensions of approximately 77 inches by 42 inches corresponding to a twin size mattress spring assembly.

6. The paver of claim 4, wherein the paver has dimensions of approximately 85 inches by 64.5 inches corresponding to a queen size mattress spring assembly.

7. The paver of claim 4, wherein the paver has dimensions of approximately 77 inches by 83 inches corresponding to a king size mattress spring assembly.

8. The paver of claim 1, wherein the recycled materials are crushed to a size of one inch or smaller in diameter.

9. A method of manufacturing a paver, the method comprising:
crushing recycled materials to a size of one inch or smaller in diameter;
placing a mattress spring assembly into a concrete mold;
mixing cement with the crushed recycled materials and water to form a concrete mixture;
pouring the concrete mixture into the concrete mold containing the mattress spring assembly; and
allowing the concrete mixture to cure; and removing the cured paver from the concrete mold.

10. The method of claim 9, wherein crushing the recycled materials comprises using at least one of a jaw crusher, cone crusher, impact crusher, ball mill, hammer mill, and roll crusher.

11. The method of claim 9, wherein mixing the cement comprises mixing at between 14 and 18 revolutions per minute.

12. The method of claim 9, wherein the water has a temperature above 50 degrees Fahrenheit.

13. The method of claim 9, further comprising: applying a release agent to the concrete mold prior to placing the mattress spring assembly.

14. The method of claim 9, further comprising: spreading the concrete mixture evenly within the mold using at least one of a trowel and vibration to remove air bubbles.

15. The method of claim 9, wherein allowing the concrete mixture to cure comprises curing for three hours.

* * * * *